US008778292B2

(12) United States Patent
Staffin et al.

(10) Patent No.: US 8,778,292 B2
(45) Date of Patent: Jul. 15, 2014

(54) FLUIDIZED BED PROCESS FOR SYNTHESIZING TRICHLOROSILANE AND A TRICHLOROSILANE SYNTHESIZER

(75) Inventors: H. Kenneth Staffin, Colonia, NJ (US); Thomas R. Parr, Hillsborough, NJ (US)

(73) Assignee: Procedyne Corporation, New Brunswick, NJ (US)

( * ) Notice: Subject to any disclaimer, the term of this patent is extended or adjusted under 35 U.S.C. 154(b) by 389 days.

(21) Appl. No.: 12/777,435

(22) Filed: May 11, 2010

(65) Prior Publication Data

US 2010/0290970 A1     Nov. 18, 2010

Related U.S. Application Data

(60) Provisional application No. 61/177,556, filed on May 12, 2009.

(51) Int. Cl.
     *C01B 33/107*          (2006.01)
     *B01J 8/24*             (2006.01)

(52) U.S. Cl.
     USPC ............ 423/342; 423/341; 422/142; 422/147

(58) Field of Classification Search
     USPC .......................... 423/341, 342; 422/142, 147
     See application file for complete search history.

(56) References Cited

U.S. PATENT DOCUMENTS

| | | | |
|---|---|---|---|
| 3,869,256 A | | 3/1975 | Ziegler |
| 4,044,109 A | * | 8/1977 | Kotzsch et al. ............... 423/342 |
| 4,080,181 A | * | 3/1978 | Feistel et al. ...................... 48/99 |
| 4,424,198 A | | 1/1984 | Ito et al. |
| 4,464,247 A | * | 8/1984 | Thacker ........................ 208/409 |
| 4,526,769 A | | 7/1985 | Ingle et al. |
| 4,585,643 A | * | 4/1986 | Barker, Jr. ..................... 423/342 |
| 5,378,434 A | | 1/1995 | Staffin et al. |
| 2009/0104104 A1 | | 4/2009 | Inaba |

OTHER PUBLICATIONS

International Search Report and Written Opinion dated Jul. 20, 2010 issued for International Patent Application No. PCT/US10/34344 filed May 11, 2010.

* cited by examiner

*Primary Examiner* — Ngoc-Yen Nguyen
(74) *Attorney, Agent, or Firm* — K&L Gates LLP (57) ABSTRACT

A multi-stage fluidized bed synthesizer and process for synthesizing trichlorosilane wherein silicon particles can be fed into one of multiple intercommunicating fluidizing zones in a fluidized bed reactor supplied with fluidizing gas comprising hydrogen chloride. The fluidizing zones can be disposed laterally adjacent one to another, for example side-by-side, or in a horizontal line. Useful embodiments include: feeding the fluidizing gas at different rates and/or compositions to the different fluidizing zones; filtration apparatus to filter the gaseous product and return silicon particles to the reactor and cooling systems for cooling the fluidized bed and the gas volumes above the fluidized beds, if present.

12 Claims, 3 Drawing Sheets

FLUIDIZED BED PROCESS FOR SYNTHESIZING TRICHLOROSILANE AND A TRICHLOROSILANE SYNTHESIZER

CROSS-REFERENCE TO A RELATED APPLICATION

This application claims the benefit of provisional patent application No. 61/177,556, filed on May 12, 2009, the disclosure of which is incorporated by reference herein.

STATEMENT REGARDING FEDERALLY SPONSORED RESEARCH OR DEVELOPMENT (Not Applicable.)

The present invention relates to a fluidized bed process for synthesizing trichlorosilane and a trichlorosilane synthesizer.

BACKGROUND OF THE INVENTION

Photovoltaic cells have a number of uses, in the solar energy industry, in the electronics industry and elsewhere. For example, photovoltaic cells can be used in solar energy panels for converting solar energy to electricity. For good energy conversion efficiency, photovoltaic cells are generally fabricated from high-purity polycrystalline silicon, also known as "polysilicon".

Accordingly, as interest in solar energy increases, there is a growing demand for photovoltaic cells and for polysilicon from which to fabricate the photovoltaic cells. One useful commercial process for producing polysilicon employs trichlorosilane as a starting material.

U.S. Pat. No. 4,526,769 to Ingle et al. describes a process for producing trichlorosilane and equipment for practicing that process. As described, the process is a two-stage process which combines the reaction of silicon tetrachloride and hydrogen with silicon with the reaction of hydrogen chloride with silicon. A two stage reactor can be provided with a first stage heated to a temperature of about 500° C.-700° C. and a second stage maintained at a temperature of about 300° C.-350° C. Each of the first and second stages of the reactor is charged with silicon particles. According to the patent, a mixture comprising hydrogen and silicon tetrachloride is flowed through the silicon particles in the heated first stage to cause a partial hydrogenation of the silicon tetrachloride. The effluent from the first stage is described as including trichlorosilane and unreacted hydrogen and silicon tetrachloride. Hydrogen chloride is added to this effluent and the mixture of gases is passed through the silicon particles in the second stage of the reactor.

Pursuant to the growing demand for solar energy grade photovoltaic cells and high-purity polysilicon, there is a need for improved processes and systems for producing trichlorosilane suitable for use in the manufacture of polysilicon.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

SUMMARY OF THE INVENTION

In one aspect the present invention provides a multi-stage fluidized bed process for synthesizing trichlorosilane wherein the process comprises feeding a stream of silicon particles into a first fluidizing zone in a heated reaction vessel at a feed location. The reaction vessel can comprise multiple intercommunicating fluidizing zones disposed laterally adjacent one to another.

The process can also comprise feeding a fluidizing gas upwardly through each fluidizing zone to fluidize the silicon particles in the each fluidizing zone and form a fluidized bed of particles in each fluidizing zone. One suitable fluidizing gas comprises hydrogen chloride which can react with the silicon particles in the fluidized bed to form trichlorosilane.

In addition, the process can comprise guiding the stream of fluidized particles to flow through the fluidizing zones laterally in sequence from the feed location, outputting from the reaction vessel gaseous product comprising trichlorosilane. Optionally, if desired the process can comprise discharging the silicon-depleted residue of the stream of silicon particles from a discharge location communicating with the last fluidizing zone in the lateral sequence through a discharge port.

By feeding fluidizing gas into multiple laterally displaced fluidizing zones, the fluidizing gas can be fed separately to each fluidizing zone. Also, the fluidizing gas can be fed to each fluidizing zone at a rate independent of the rate of gas feed to another of the fluidizing zones, or with a different composition or with both a different composition and a different feed rate.

By such measures, the process parameters can be adjusted as the solid silicon particles progress through the trichlorosilane synthesizer and diminish in size, to adapt to differing process requirements.

If desired, the process can include filtering the gaseous product to remove entrained silicon particles from the gas stream and returning the filtered silicon particles to the reaction vessel.

The invention includes a trichlorosilane product produced by a process according Hto the invention.

In another aspect, the invention provides a fluidized bed process for synthesizing trichlorosilane wherein the process comprises feeding a stream of silicon particles into a heated reactor comprising at least one fluidizing zone and feeding a fluidizing gas upwardly through the at least one fluidizing zone to fluidize the silicon particles in the fluidizing zone and form a fluidized bed. The fluidizing gas can comprise hydrogen chloride and can react with the silicon particles in the fluidized bed to form trichlorosilane. In this aspect, the process comprises outputting from the reaction vessel gaseous product comprising trichlorosilane, filtering the gaseous product to remove entrained particles from the gas stream and returning the filtered particles to the reaction vessel. The entrained particles that are removed by filtration can comprise unreacted silicon, or by-product materials or both unreacted silicon and by-product materials.

Optionally, the process can comprise discharging from the heated reactor the silicon-depleted residue of the stream of silicon particles, which residue may include, or be made up of, by-products.

In a further aspect, the invention provides a trichlorosilane synthesizer for synthesizing trichlorosilane which comprises a fluidized bed reactor, a solids inlet for introducing a stream of silicon particles, with or without impurities such as by-products, into the reactor, the solids inlet being communicable with a supply of silicon particles, and a plurality of fluidizing zones in the fluidized bed reactor. Each of the fluidizing zones can be laterally adjacent to at least one other of the fluidizing zones.

A gas distributor can extending beneath each fluidizing zone and can communicate with each respective fluidizing zone to admit fluidizing gas upwardly to the fluidizing zones. The fluidizing gas can comprise hydrogen chloride and can contact and react with the silicon particles in the fluidizing zones, generating a gaseous product.

The trichlorosilane synthesizer can also comprise a temperature-control system in thermal communication with the fluidized bed reactor to control the temperature of the reactor, and at least one gas outlet located above the fluidizing zones for outputting the gaseous product from the reactor. In addition, the trichlorosilane synthesizer can comprise a solids outlet for discharging the silicon-depleted residue of the silicon particles, from the reactor, the solids outlet being located downstream of the fluidizing zones, if desired.

The fluidized bed reactor can define a flow path for the silicon particles, which flow path extends laterally from the solids inlet through each fluidizing zone to the solids outlet.

In a still further aspect the invention provides a trichlorosilane synthesizer for synthesizing trichlorosilane which comprises a fluidized bed reactor, a solids inlet for introducing silicon particles into the reactor, and a fluidizing zone located in the reactor.

The trichlorosilane synthesizer in this aspect of the invention further comprises a gas distributor extending beneath the fluidizing zone and communicating with the fluidizing zone to admit fluidizing gas upwardly to the fluidizing zone to contact and react with silicon particles in the fluidizing zone. The fluidizing gas can comprise hydrogen chloride. The trichlorosilane synthesizer also comprises a temperature-control system to control the temperature of the reactor, a gas outlet for outputting from the reactor the gaseous product of the reaction between the fluidizing gas and the silicon particles, the gaseous product comprising trichlorosilane, and a solids outlet for discharging the silicon-depleted residue of the stream of silicon particles from the reactor.

In addition the trichlorosilane synthesizer in this aspect of the invention comprises a filtration apparatus in fluid communication with the gas outlet to remove entrained particles from the gas stream received from the gas outlet and return the filtered particles to the reaction vessel.

BRIEF DESCRIPTION OF THE SEVERAL VIEWS OF THE DRAWING

Some embodiments of the invention, and of making and using the invention, as well as the best mode contemplated of carrying out the invention, are described in detail herein and, by way of example, with reference to the accompanying drawings, in which like reference characters designate like elements throughout the several views, and in which.

DETAILED DESCRIPTION OF THE INVENTION

Solar energy is an important alternative to classical carbon-based energy sources such as coal, oil and gas. Accordingly, there is significant demand for high-purity solar grade polysilicon material which can be used to manufacture photovoltaic cells for converting solar energy to electricity.

For good energy efficiency, high purity of the polysilicon material is desirable. One process for producing polysilicon material of good purity, which can be employed in practicing some aspects of the present invention, comprises reacting a metallurgical grade of silicon, for example silicon of approximately 98.5% purity, with anhydrous hydrogen chloride (HCl) at elevated temperature and pressure to form trichlorosilane ($HSiCl_3$) gas plus hydrogen ($H_2$). While the invention is not intended to be limited by any particular theory, it is believed that the synthesis proceeds by the reaction shown in equation (1) below:

$$Si + 3HCl \rightarrow HSiCl_3 + H_2 \quad (1)$$

The kinetics of this reaction are usually such that various by-products can also be formed. For example, silicon tetrachloride ($SiCl_4$) and hydrogen can be formed by the reaction shown in equation (2) below:

$$HSiCl_3 + HCl \rightarrow SiCl_4 + H_2 \quad (2)$$

The following two reactions (3) and (4) may also proceed, usually to a lesser extent:

$$Si + 4HCl \rightarrow SiCl_4 + 2H_2 \quad (3)$$

and $$HSiCl_3 + HCl \rightarrow SiCl_4 + H_2 \quad (4)$$

Pursuant to what appear to be the dominant reactions under many production conditions, namely the reactions shown in equations (1) and (2), the gas phase leaving the reaction vessel can comprise trichlorosilane, hydrogen and silicon tetrachloride. In addition to silicon tetrachloride, other by-products can also be formed, for example, dichlorosilane and traces of silane compounds having Si—Si and Si—O—Si bonds. In some commercial processes for making trichlorosilane, the gas leaving the reactor can be further processed by distillation and absorption to yield a pure trichlorosilane product which can then be converted to a pure grade of polysilicon suitable for use in the solar energy industry, or for other purposes.

Pursuant to a further aspect of the present invention, the gas leaving the reaction vessel can optionally be filtered to remove entrained particles, and the filtered particles can be returned to the reaction vessel. The entrained particles that are removed by filtration can comprise unreacted silicon, or by-product materials, or both unreacted silicon and by-product materials. By-products can be formed, for example, from impurities in the metallurgical grade silicon such as aluminum and/or iron which can form particles of aluminum chloride or iron chloride.

Kinetic studies of equations (1) and (2) suggest that, under typical processing conditions, the two reactions proceed predominantly in sequence, rather than simultaneously, with reaction (1), the preferred reaction, proceeding first and reaction (2) which produces the undesired by-product silicon tetrachloride, mostly proceeding second.

In some known processes, the reaction shown by equation (1) can be performed commercially in a continuous vertical fluid bed reactor with silicon particles being continuously fed into the reactor to constitute the fluid bed and with anhydrous hydrogen chloride supplied to the reactor as fluidizing gas.

As stated, the present invention is not intended to be bound by any particular theory. However, it is believed that as the fluidizing gas rises vertically through the fluidized bed of silica, the reactions can proceed with reaction (1) lower in the vertical bed and reaction (2) higher in the fluid bed of silicon. The silicon reacts with the fluidizing gas to form products that are gaseous under the reaction conditions, and the gaseous products leave as off gas from the top of the reactor. Equation (1) is a significantly exothermic reaction while equation (2) is an endothermic reaction requiring some addition of heat. These thermodynamic considerations can lead to difficult problems in controlling the reaction temperature in the fluid bed. A non-uniform temperature can result in overheating the lower portion of silicon bed near the distributor plate which is usually employed to introduce the fluidizing gas beneath the fluidized bed uneven temperatures in the upper portion. Such temperature conditions can sometimes increase formation of by-products and reduce the yield of trichlorosilane.

One useful aspect of the present invention provides a trichlorosilane synthesizer which comprises an approximately horizontal fluid bed, or fluidized bed reactor which can process a relatively shallow bed of particulate silicon. Such a fluidized bed reactor can comprise multiple intercommunicating fluidized beds arranged side-by side. The silicon particles can advance from a feed end of the fluidized bed reactor to the discharge end driven by the hydraulic-like behavior which fluidized solids can exhibit. The silicon particles are continuously converted to the gaseous products as they flow laterally through the synthesizer, and little, if any silicon may emerge at the discharge end.

Hydrogen chloride fluidizing gas can be fed to a plenum chamber at the bottom of the approximately horizontal reactor through ports distributed in the bottom of the reactor from the feed end to the discharge end. The approximately horizontal reactor can be equipped with internal baffling which controls the residence time distribution of the fluidized particles as they flow through the reactor, to achieve a more uniform residence time, of desired value, of the particles in the reactor.

Employment of shallow bed in such a horizontal reactor can favor the reaction of equation (1) over that of equation (2) increasing the yield of trichlorosilane providing a more efficient reactor, enabling a smaller reactor to be employed per unit output capacity required. Temperature control problems can also be efficiently managed in some embodiments of such a fluidized bed reactor, as is further described elsewhere herein.

An approximately horizontal multistage reactor can permit a reduced flow of fluidizing gas in one or more downstream stages as the silicon particles are diminished in size by conversion to trichlorosilane. Vertical trichlorosilane synthesizers may lack the ability to segregate silicon particles by size, and fine particles may be subject to excessive entrainment in the fluidizing gas.

The accompanying drawings illustrate several embodiments of fluidized bed reactor which are suitable for use as a trichlorosilane synthesizer. To synthesize trichlorosilane, solid particles of silicon can be reacted with a hydrogen-chloride containing gas in one or more fluidized beds contained within the fluidized bed reactor, which can operate at elevated temperatures and pressures, to yield a gaseous product containing trichlorosilane. Residual solid particles produced by the process are likely to have a relatively low silicon content and a relatively high content of impurities and can be recycled, if desired, or sent to waste. Because much of the silicon is converted to trichlorosilane gas, the volume of output particles is likely to be substantially smaller than the input volume of solid particles in such a process.

If desired, the illustrated fluidized bed reactor can be employed in other processes wherein particulate solids are reacted with a gaseous feedstock to produce a useful gaseous product, particularly, but not exclusively, in processes which operate at elevated temperature and pressure and have a relatively small, or no solid output, which may have little or no commercial value. For example, the discharged residue could be as little as five percent by weight of the feedstock, or even less.

Figures 1, 2, 3:
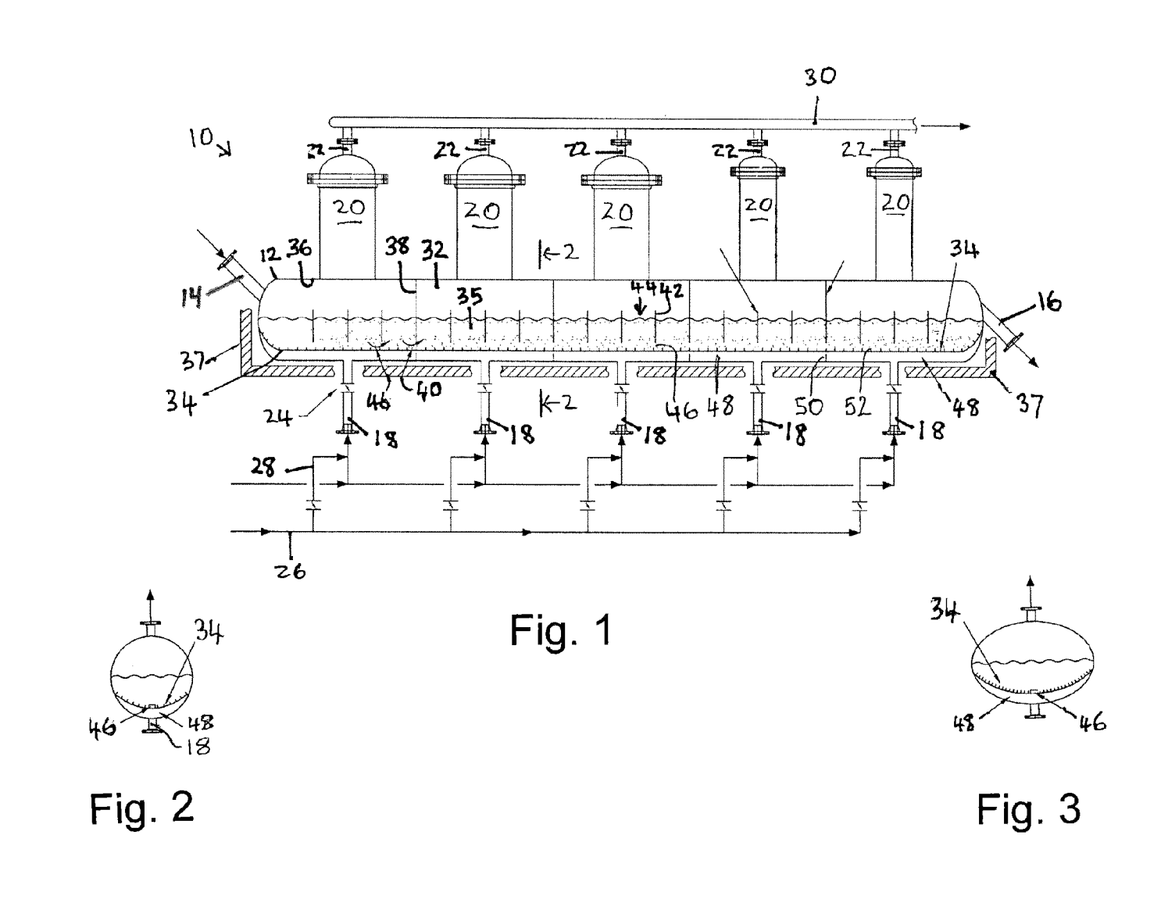
FIG. 1 is a schematic longitudinal sectional view of a first embodiment of fluidized bed reactor according to the invention which is suitable for use as a trichlorosilane synthesizer.
FIG. 2 is a cross-sectional view on the line 2-2 of FIG. 1.
FIG. 3 is a view similar to FIG. 2 showing a possible modification of the fluidized bed reactor illustrated in FIGS. 1-2.

Referring to FIG. 1, the trichlorosilane synthesizer shown comprises a fluidized bed reactor 10 which includes a reaction vessel 12, a solids inlet 14, a solids outlet port 16, multiple fluidizing gas supplies 18, a plurality of filter units 20 and a plurality of gas outlets 22. Fluidized bed reactor 10 is intended to convey a stream of solid silicon particles through reaction vessel 12 in a fluid-like stream and to convert the particles to trichlorosilane as they advance through reaction vessel 12.

Solids inlet 14 can communicate with, or be in communication with, a source of silicon particles (not shown) and can introduce a stream of silicon particles into fluidized bed reactor 10. Solids outlet port 16 desirably is downstream of solids inlet 14, and is laterally displaced from solids inlet 14. For example, where fluidized bed reactor 10 has a longitudinal configuration, as shown in FIG. 1, solids inlet 14 can be located at one end of fluidized bed reactor 10 and solids outlet port 16 can be located at the other end of fluidized bed reactor 10. Solids outlet or discharge port 16 can function as an overflow port. Also, if desired, solids outlet port 16 can be adjustable so that the vertical location of solids outlet port 16 can be selected or adjusted to help determine or maintain the heights of the fluidized beds in reaction vessel 12.

Conveniently, the number of fluidizing gas supplies 18, filter units 20 and gas outlets 22 is the same in each case, for example five of each are shown in FIG. 1. However, variations of these numbers are possible as will be further described herein, or will be, or become apparent from this disclosure.

Each fluidizing gas supply 18 can be controlled by a control valve such as control valve 24. If desired, recycled gas, or another suitable gas, conveyed by a recycled gas line 26 can be combined with each gas supply 18 by an individually valved branch feed such as auxiliary feed 28. Recycled gas can be provided from downstream processing or from another suitable source.

Gas outlets 22 can be configured to communicate with, or to be in communication with, a downstream trichlorosilane processing system (not shown) or a trichlorosilane storage system (not shown), via a common output line 30, if desired, when fluidized bed reactor 10 is utilized for trichlorosilane production and the gaseous product output through gas outlets 22 comprises trichlorosilane. The downstream trichlorosilane processing system, if employed, can comprise any suitable equipment, for example a trichlorosilane purifier, and can subject the gaseous product output from gas outlets 22 to any desired processing, for example distillation of the gaseous product after condensation, and/or absorption purification.

Fluidized bed reactor 10 further comprises a plurality of fluidizing zones 32 within reaction vessel 12 arranged in side-by-side relationship along the length of reaction vessel 12 so that each of the fluidizing zones 32 is laterally adjacent to at least one other fluidizing zone 32. For example fluidizing zones 32 can be arranged along a line extending laterally from solids inlet 14 through each fluidizing zone 32 in turn to solids outlet port 16. In this or another suitable manner, fluidizing zones 32 can be displaced one from another in a lateral sense, with at least a component of the displacement in the horizontal direction.

Other possible side-by-side arrangements of fluidizing zones 32 will be apparent to a person of ordinary skill in the art, or will become apparent in the future, as the art develops. For example, the fluidizing zones 32 can be arranged along a path which, as viewed from above is L-shaped or curved, if desired.

Usefully, fluidized bed reactor 10 can define a flow path for the stream of silicon particles along which the stream of silicon particles can be caused to flow either continuously, or discontinuously, as is desired. Desirably, the flow path can be designed to discourage by-passing wherein some particles take a shorter route through fluidized bed reactor 10 than do other particles. For example, the flow path can have a serpentine, sinuous, zigzag or convoluted form. In many cases, it is desirable for the solid particles to have similar residence times in reactor 10 for which purpose control of by-passing can be helpful.

In addition, fluidized bed reactor 10 can comprise a gas distributor plate 34 which extends beneath each fluidizing zone 32. Desirably, gas distributor plate 34 can communicate with each gas supply 18 and each fluidizing zone 32 to admit fluidizing gas received from one or more of the gas supplies 18 upwardly to each of the fluidizing zones 32. Gas distributor plate 34 is further described elsewhere herein.

To produce trichlorosilane from silicon, each fluidizing gas supply 18 can comprise a hydrogen-chloride-containing fluidizing gas and can communicate the gas to gas distributor plate 34. If desired, the gas supplies 18 can comprise a plurality of different gases having different compositions or a plurality of different gas flow rates or both a plurality of different gas compositions and a plurality of different gas flow rates. For example one or more gas supplies 18 can also comprise hydrogen gas to discourage conversion of trichlorosilane to silicon tetrachloride. Fluidizing gas can be supplied from gas supplies 18 to fluidizing zones 32 at an appropriate pressure to create a fluidized bed 35 of solid particles in each fluidizing zone 32.

The use of fluidized bed reactor 10 for the production of trichlorosilane is more fully described below. Gas supplies 18 can supply a different gas or gases from hydrogen chloride, as appropriate, if fluidized bed reactor 10 is to be employed for another process than trichlorosilane synthesis.

Gas outlets 22 can communicate one with each fluidizing zone 32, so that, in the illustrated embodiment of the invention, each fluidizing zone 32 is served by a specific filter unit 20. In one alternative embodiment of the invention (not illustrated), a single filter unit can service all the gas outlets 22. In a further embodiment of the invention (also not illustrated), fluidizing zones 32 can intercommunicate the gaseous product flow and a common gas outlet 22 is provided with which a filter unit such as filter unit 20 can be coupled, if desired.

It will be understood that filter units 20, whether one or more than one is employed, are exemplary of filtration apparatus which can optionally be employed as a component of fluidized bed reactor 10. The filtration apparatus can be useful to remove fines or other solids from the gaseous product, to thereby improve the quality of the gaseous product. If desired, solid particles entrained in the gaseous product can be captured by the filtration apparatus and returned to reaction vessel 12 for further processing.

If desired, filter units 20 can vary in capacity according to the processing load a respective fluidizing zone 32 is expected to deliver, in terms of gas flow volumes and solids content in the gas output from the fluidizing zones 32. To that end, filter units 20 can be larger or smaller according to the anticipated processing load. For example, in the five zone fluidized bed reactor 10 illustrated in FIG. 1, the two upstream filter units 20 can be relatively large, the two downstream filter units 20 can be relatively smaller and the central filter unit 20 can be of intermediate size. Filtration apparatus useful in the practice of the invention is further described elsewhere herein.

Reaction vessel 12, as shown, has an elongate configuration, resembling a tube with closed ends, and, desirably, is disposed approximately horizontally. For example, fluidized bed reactor 10 can comprise a generally cylindrical reactor 10 vessel extending laterally between solids inlet 14 and solids outlet port 16. Fluidized bed reactor 10 can house the fluidizing zones 32 and can have any suitable cross-sectional shape, for example, curved, circular, oval or elliptical or approximately polygonal, for example triangular, rectangular or hexagonal, optionally with rounded apices, in cross section.

FIG. 2 illustrates an embodiment of reaction vessel 12 which has a circular cross-sectional-sectional shape. FIG. 3 illustrates an embodiment of reaction vessel 12 which has an elliptical cross-sectional-sectional shape. In each embodiment, gas distributor plate 34 can, as described above, extend essentially horizontally in the lateral direction. In addition, gas distributor plate 34 can be concavely curved upwardly about the lateral direction, to conform with the cross-sectional-sectional shape of gas distributor plate 34, as shown in FIGS. 2 and 3. In each of FIGS. 2 and 3 no temperature control system or filter unit 20 is shown.

As stated, reaction vessel 12 can be disposed approximately horizontally. For example reaction vessel 12 can have a horizontal, or essentially horizontal disposition so that each fluidizing zone 32 has a floor on the same horizontal level, the floor optionally being defined by gas distributor plate 34. Each fluidizing zone 32 can have a ceiling, such as a ceiling 36, provided by an internal surface of reaction vessel 12 wherein each ceiling 36 is on the same horizontal level. For example, the fluidizing zones can be vertically aligned and horizontally displaced.

In other embodiments of the invention, reactor 12 can be inclined below the horizontal, in the longitudinal flow direction from solids inlet 14 to solids outlet port 16, if desired.

Fluidizing zones 32 can be laterally displaced one from the other so that gaseous product from one fluidizing zone does not rise upwardly into another fluidizing zone. Any suitable inclination from the horizontal of reaction vessel 12 or, possible of gas distributor plate 34, can be employed, if desired. For example, the inclination of fluidizing zones 32, if any, can be less than about 20 degrees, or less than about 10 degrees, or less than about 5 degrees, in each case below the horizontal in the direction of flow. Thus, in some cases, a horizontally disposed reaction vessel 12 can be tipped down from feed to discharge at an angle of a few degrees to about 10 or about 15 degrees to set up a condition where each downstream zone or other compartment is at a lower level than the adjacent upstream zone or compartment. Possibly, the inclination of one fluidizing zone can be different from the inclination of another fluidizing zone 32.

Consistently with the anticipated fluid-like behavior of the solid particles in reaction vessel 12, inclination of reaction vessel 12, or of a fluidizing zone 32 downwardly, below horizontal in the direction of travel, is expected to accelerate the progress of the stream of solid particles and to decrease the average residence time of the particles in reaction vessel 12.

Depending upon the process it is intended to carry out, fluidized bed reactor 10 can have significantly different proportions from what is shown in FIGS. 1-3. In general, the configuration of fluidized bed reactor 10 can be varied according to the particular process the reactor is expected to carry out. For example, fluidized bed reactor 10 can usefully be constructed to withstand substantial elevated temperatures and pressures for synthesizing trichlorosilane, or other purposes.

Fluidized bed reactor 10 can include a temperature-control system to control the temperature of fluidized bed reactor 10, or of one or more regions of fluidized bed reactor 10. As shown in FIG. 1, the temperature control system can include a heating jacket 37 can extend around and embrace the lower portion of fluidized bed reactor 10. Depending upon the requirements of a particular process, other temperature control systems, for example a cooling system can be employed, as an alternative to, or as a supplement to, heating jacket 37, some of which are described herein.

Thus, the temperature-control system can comprise a heating system and a cooling system for heating or cooling the reactor in different stages of a particular process. Either or both the heating and the cooling system can be selectively operable to heat or cool one fluidizing zone 32 independently of other fluidizing zones 32. For example, heating jacket 37 can have individual heating zones, one for each fluidizing zone 32 and individual temperature sensors and temperature controllers can be provided for each fluidizing zone 32. Alternatively, multiple heating jackets can be provided. Other suitable heating elements or systems for individual heating of the fluidizing zones 32 will be apparent to a person of ordinary skill in the art, or will become apparent in the future, as the art develops.

For trichlorosilane synthesis, heating jacket 37 can be employed to elevate the temperature or temperatures within fluidizing zones 32 sufficiently to initiate synthesis of trichlorosilane from silicon and anhydrous hydrogen chloride. Usefully, the temperature control system can effectively control the temperature or temperatures in fluidizing zones 32 to maintain the trichlorosilane synthesis reaction in a stable manner as the reaction proceeds exothermically. For example, the temperature control system can be operated to maintain the heat balance of the system for a given solids feed rate, employing cooling as needed, to provide a steady state, efficiently operating system. Suitable cooling systems and apparatus are described elsewhere herein.

Internally, reaction vessel 12 comprises at least one zone divider 38 to divide reaction vessel 12 into fluidizing zones 32 which are adjacent and contiguous. Each zone divider 38 can extend transversely of the lateral direction in which fluidizing zones 32 are arranged. As illustrated, each zone divider 38 extends the full height of reaction vessel 12 so that little or no hot, rising gaseous product is likely to cross over from one fluidizing zone to another fluidizing zone. Also, each zone divider 38 can comprise at least one zone opening 40 in a lower portion of the divider to allow the stream of silicon particles to flow from one fluidizing zone 32 to the adjacent fluidizing zone 32, in a lateral direction.

If desired, the open area of zone openings 40 can be varied from one zone divider 38 to the next to provide a desired increment in level of the fluidized bed 35 in the fluidizing zone 32 upstream of the respective zone divider 38 as compared with the fluidized bed 35 in the fluidizing zone 32 downstream of the respective zone divider 38. Increasing the open area of the zone opening will usually reduce the bed level increment, and vice versa, for a given solid particle flow rate.

Each zone divider can comprise a single zone opening 40 or a plurality of zone openings and the at least one zone opening 40 can be located in any part of the respective zone divider 38 which can communicate with respective ones of fluidized beds 35 for passage of solid particles between fluidizing zones 32. For example the at least one zone opening 40 can be located near the bottom of the respective divider 38, above, or adjacent to gas distributor plate 34 or in another location where the zone opening 40 can be below the top of the fluidized bed 35 and above gas distributor plate 34.

Any suitable number of fluidizing zones 32 can be provided in fluidized bed reactor 10. For example, the number of fluidizing zones 32 can be 3, 4, 5, 6, 7, or an integer in a range of from 2 to about 20, or an integer in a range of from 3 to about 10, or an integer in a range of from 3 to about 40.

Each fluidizing zone 32 can comprise at least one baffle 42 to divide the respective fluidizing zone 32 into multiple stages 44. Each baffle 42 can extend transversely of the lateral direction in which fluidizing zones 32 are arranged. Also, each baffle can comprise at least one baffle opening 46 to allow passage of and guide the stream of silicon particles to flow from one fluidizing stage 32 to an adjacent fluidizing stage 32. The at least one baffle opening 46 can be located in any suitable portion of baffle 42 that permits passage of the solid particles between fluidized beds 35. For example the at least one baffle opening 46 can be located near gas distributor plate 34 at the bottom of the baffle or at any other location beneath the height of the lower of the fluidized beds 35 that abut the respective baffle 42. Desirably, baffle openings 46 and zone openings 40 can be spaced on alternate sides of a center line along the axis of reaction vessel 12, optionally near the side walls of the reaction vessel 12, to lengthen the flow path through reaction vessel 12.

Desirably, each baffle 42 has an intermediate height within reaction vessel 12 so that solids are largely or entirely prevented from crossing above a baffle 42 from one stage 44 to another stage 44. However hot rising gas can mingle freely within each fluidizing zone 32 above the baffles 42.

Any suitable number of baffles can be employed. For example, reaction vessel 12 can comprise from 1 to about 10 baffles 42 dividing each fluidizing zone 32 into stages. Usefully, fluidized bed reactor 10 can contain sufficient baffles 42 to induce an essentially plug flow profile of the stream of silicon particles through the reaction vessel 12. For example there may be sufficient baffles to cause a high proportion of the silicon particles, such as at least 80 percent by weight, or at least 90 percent by weight to have approximately similar residence times in reaction vessel 12, such as within about 20 percent or within about 10 percent of the average residence time.

In some embodiments of the invention, the fluidized bed reactor 10 can comprise at least three fluidizing zones 32, each fluidizing zone 32 being divided by baffles into at least three stages.

As may be seen, the reaction vessel 12 employed in the fluidized bed reactor 10 illustrated in the drawings by way of example comprises five fluidizing zones 32 of equal volume defined by four zone dividers 38. In addition, each of the five fluidizing zones 32 is divided by three baffles 42 into an equal number of stages 44, in this example four stages and each stage 44 has the same volume. Other arrangements are possible as will be apparent to a person of ordinary skill in the art, or will become apparent in the future, as the art develops. For example different numbers of fluidizing zones 32 or stages 44 or of both fluidizing zones 32 and stages 44, can be employed, if desired. Alternatively, or in addition, different sizes can be employed for fluidizing zones 32 and stages 44 or for both fluidizing zones 32 and stages 44. For example fewer stages or smaller volumes can be employed in one or more downstream fluidizing zones 32, where the solid particles are smaller, if desired.

Usefully, for example to help avoid by-passing, baffle openings 46 can be staggered transversely of the lateral direction. The zone openings 40 and the baffle openings 46 can be configured and arranged to define a serpentine path through reactor 10 from the feed location to the discharge location for the stream of silicon particles.

Zone dividers 38 can be disposed and arranged so as to define the fluidizing zones 32 to occur in any desired flow sequence. As shown, the flow sequence from one fluidizing zone to the next can extend in an essentially straight line from solids inlet 14 at one end of fluidized bed reactor 10 to solids outlet 16 at the other end of fluidized bed reactor 10. Other arrangements are possible.

For example, in another arrangement, reaction vessel 12 can accommodate one or more additional rows of fluidizing zones 32 parallel to the row of five fluidizing zones 32 that are shown in FIG. 1. The additional row or rows of fluidizing zones can be disposed in front of or behind the plane of the paper. If desired, the rows of fluidizing zones 32 can be interconnected at the ends to provide a serpentine flow path through the fluidizing zones, from one fluidizing zone to another, without regard to the disposition of baffles 42, if employed, to provide an extended flow path for the solid particles and greater residence time in the fluidized bed reactor 10 for the solid particles. Alternatively, the additional rows of fluidizing zones 32 can provide a fluidized bed reactor 10 having multiple parallel flow paths through the reaction vessel 12. This arrangement can be operated by employing multiple solids inlets 14, or a common solids inlet, at one end of reaction vessel 12 and multiple solids outlets 16, or a common solids outlet, at the other end of reaction vessel 12, or in another suitable manner.

Desirably, both zone dividers 38 and baffles 42 are disposed with an approximately upright orientation, for example a vertical orientation, or a near-vertical orientation, or within about 5° of vertical, or within about 10° of vertical.

Gas distributor plate 34 can be apertured and can extend laterally across reaction vessel 12 beneath each of fluidizing zones 32. Gas distributor plate 34 can serve as the floor of each fluidizing zone 32.

Optionally, fluidized bed reactor 10 can include a plenum chamber 48 beneath gas distributor plate 34 which plenum chamber 48 receives fluidizing gas from one or more gas supplies 18, under pressure, and discharges the fluidizing gas or gases into fluidizing zones 32 through the aperturing in gas distributor plate 34. If desired, plenum chamber 48 can comprise independent gas distribution regions defined by gas separators 50 which correspond with the fluidizing zones 32. With this construction, a desired fluidizing gas can be admitted separately to each fluidizing zone 32, independently of the fluidizing gas or gases admitted to other fluidizing zones 32. Alternatively, gas distributor plate 34 can provide a common feed of fluidizing gas to all the fluidizing zones 32, without employing gas separators 50, if desired.

The aperturing in gas distributor plate 34 can comprise a number of gas nozzles 52 distributed more or less evenly over the extent of gas distributor plate 34 that provides a floor to a fluidizing zone. A plurality of gas nozzles 52 can open into each stage 44 of each fluidizing zone 32. Desirably, sufficient gas nozzles are provided in gas distributor plate 34 to provide an adequate gas pressure to fluidize solid particles in reaction vessel 12 over the entire floor area of each fluidizing zone 32, helping to avoid dead spots where particles can become quiescent.

Any suitable gas nozzles 52 can be employed. Desirably, gas nozzles 52 are configured to convey fluidizing gas from plenum chamber 50, through gas distributor plate 34, and to discharge the fluidizing gas on to the floor of stages 44 of fluidizing zones 32, provided by gas distributor plate 34. Optionally each gas nozzle 52 can discharge gas outwardly in a number of directions or as an approximately circular pressure wave radiating from each nozzle 52.

One useful structure for gas nozzle 52 (not shown) comprises a tuyere having a neck traversed by a longitudinal gas passage and a durable head traversed by one or more downwardly inclined distributor passages communicating with the gas passage and opening out on the underside of the head. The heads of gas nozzles 52 desirably are of sturdy and durable construction to sustain constant abrasion by the moving fluidized solids particles, without unacceptable damage or wear.

As an alternative to gas nozzles 52, the gas distributor plate 34 aperturing can comprise a plurality of small apertures in gas distributor plate 34, a plurality of gas inlet ports, a plurality of screw-cap dispensing heads or other suitable gas dispensing members such as will be apparent to a person of ordinary skill in the art, or will become apparent in the future, as the art develops.

In an alternative, simplified construction of fluidized bed reactor 10 (not shown), the plurality of gas supplies 18 can be replaced by a single gas supply communicating with plenum chamber 48, and plenum chamber 48 can lack gas separators 50 so as to have a single volume communicating through gas distributor plate 34 with each of the fluidizing zones 32. However, employment of multiple independently operable gas supplies 18, as described herein, or as will otherwise be or become apparent, can provide more flexibility and options in operating fluidized bed reactor 10.

As described, fluidized bed reactor 10 can optionally include a filtration apparatus and the filtration apparatus can comprise, by way of example, one or more filter units 20 communicating with gas outlets 22 to remove entrained silicon particles from the gas stream received from each gas outlet 22 and optionally can return the filtered silicon particles to the reaction vessel 12.

Any filtration apparatus which can filter fine particles from hot gas, for example particles having an average particle size of one micron or less, without causing an unacceptable pressure drop, can be employed. One suitable filtration apparatus (not shown) is available from Procedyne Corporation (New Brunswick, N.J.) under the trademark MIKRO-DYNE. Other suitable filtration apparatus will be apparent to a person of ordinary skill in the art, or will become apparent in the future, as the art develops.

The detailed structure of filter units 20 is not shown in FIG. 1, as the structure can vary. For example each filter unit 20 can comprise one or more filter elements capable of allowing flowthrough of the gaseous product and of separating entrained silicon particles from the gaseous product flow without imposing an unacceptable pressure drop. One useful filter element comprises a porous cartridge filter system mounted over the top of the fluidizing zone. If desired, the or each filter element can comprise a sub-micron filter element capable of separating particles of size less than one micron from the gaseous product flow. For use in trichlorosilane synthesis, the filter elements are desirably temperature-resistant. For example, the filter elements can comprise perforated stainless steel tubes and optionally one or more layers of fine stainless steel wire mesh which can be sintered or otherwise secured to the stainless steel tubes.

If solid material collected by the filter unit 20 is to be returned to reaction vessel 12 for further processing, fluidized bed reactor 10 can include a reverse flow, or reverse pulse, gas supply which can be connected to the or each filter unit 20 to remove or "blow back" separated silicon or other particles from the filter element for return to the reaction vessel 12. The filter unit can comprise a group of filter elements and can be arranged so that a pre-set portion of filter elements in each filter element group are successively subjected to the reverse flow or reverse pulse of gas to remove collected silicon particles. If desired, cleaning of the filters can be performed from time to time or on a periodical cycle to prevent excessive pressure drop through the filters.

Such filter units 20 can be usefully employed in the embodiment of fluidized bed reactor 10 illustrated in FIG. 1, wherein a gas outlet 22 communicates with each fluidizing zone 32 and the filtration apparatus comprised by filter units 20 communicates separately and independently with each gas outlet 22. With this configuration, each filter element can be coupled with the reverse flow gas supply and fluidized bed reactor 10 so that the solid particles separated by each filter unit 20 can be returned to the respective fluidizing zone 32 providing the respective flow of gaseous product filtered by the filter unit. Thus, the filtered solid material can be returned to the fluidizing zone 32 from which it originated, for further processing.

Desirably, for effecting trichlorosilane synthesis, fluidized bed reactor 10, including the filtration apparatus, if a filtration apparatus is employed, are constructed of durable materials to be operable at elevated temperatures, for example a temperature of at least about 300° C., at least about 400° C., or at least about 500° C. Some embodiments of filtration apparatus are constructed to be operable at a temperature of at least about 800° C. Stainless steel or other suitable metal, metal alloy, carbon fiber, composite or other material can be employed to fabricate fluidized bed reactor 10 and the filtration apparatus, if employed.

Figures 4, 5, 6:
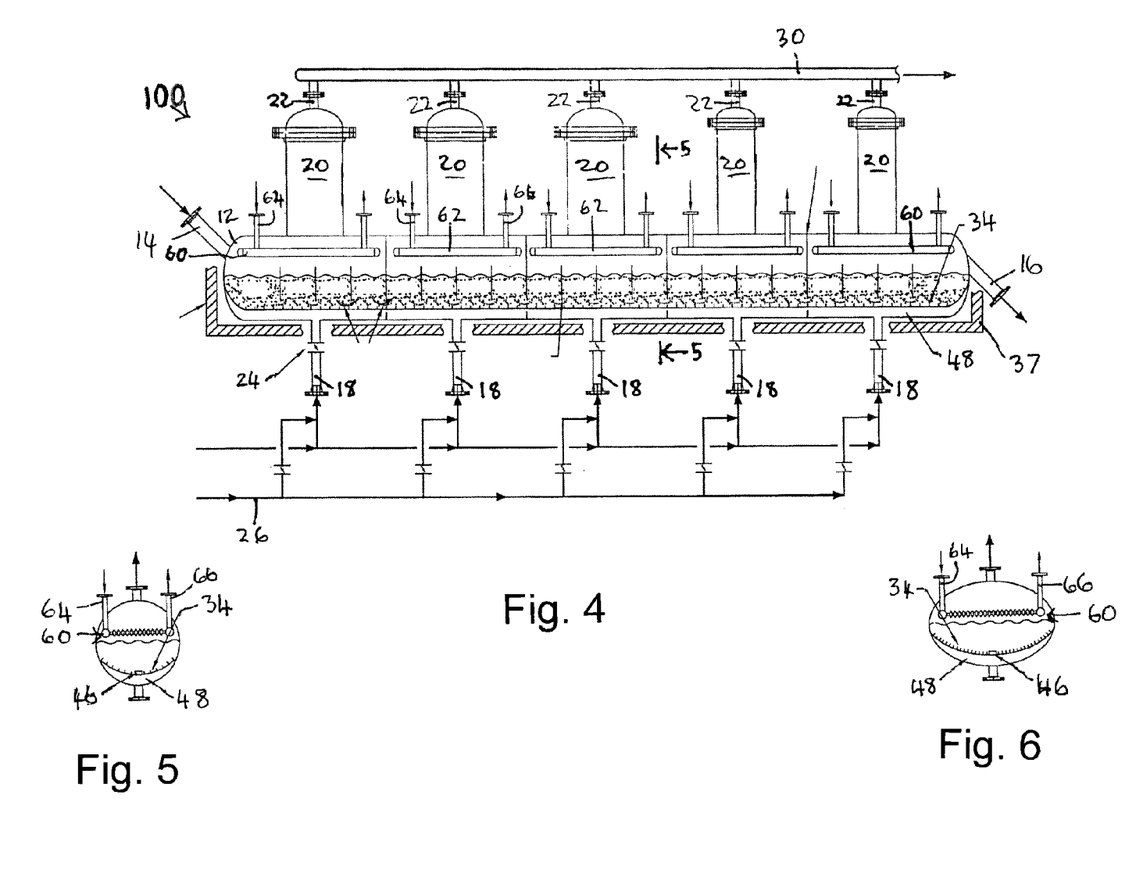
FIG. 4 is a schematic longitudinal sectional view of a second embodiment of fluidized bed reactor according to the invention which is also suitable for use as a trichlorosilane synthesizer and which includes a cooling system.
FIG. 5 is a cross-sectional view on the line 5-5 of FIG. 1.
FIG. 6 is a view similar to FIG. 5 showing a possible modification of the fluidized bed reactor illustrated in FIGS. 4-5.

The modified fluidized bed reactor illustrated in FIGS. 4-6 shows one form of cooling system for cooling the volumes above the fluidized beds 35 of solid particles in the reactor once an exothermic process carried out in the reactor, such as trichlorosilane synthesis, has been brought up to temperature. Such "over bed" cooling systems can help cool the gaseous product rising from the fluidized bed 35 and control formation of undesired by-products.

Referring now to FIGS. 4-6 of the accompanying drawings, the embodiment of fluidized bed reactor shown, referenced 100 in FIG. 4, is generally similar to fluidized bed reactor 10 as described with reference to FIGS. 1-3, with the difference that fluidized bed reactor 100 includes a cooling system to cool the gaseous product, or "off gas" produced by the fluidized beds of material in fluidizing zones 32. The same reference numerals as were used in the description of FIGS. 1-3 are used for components and parts that are similar, when describing the embodiments of FIGS. 4-6.

The cooling system employed in fluidized bed reactor 100 comprises a group of five heat exchangers 60 located one in each of the five fluidizing zones 32 where each heat exchanger 60 is disposed above the surface of the fluidized bed 35 in each fluidizing zone 32. For example, in a circular-sectioned reaction vessel 12 having a diameter of about 750 mm, the heat exchangers can be about 30 mm to about 100 mm above the surface of the respective fluidized bed 35.

Each heat exchanger 60 can comprises an array of interconnected cooling pipes 62 which extend longitudinally of reaction vessel 12. Each heat exchanger 60 can be supplied with a continuous flow of a suitable cooling fluid via at least one inlet pipe 64 and at least one outlet pipe 66.

One suitable cooling or heat transfer fluid that can be employed comprises a silicone-based, thermally stable cooling oil, for example the heat transfer fluid supplied by The Dow Chemical Company under the trademark DOWTHERM A which is described by the supplier as a eutectic mixture of two stable compounds, a biphenyl and a diphenyl oxide. Other suitable cooling fluids will be apparent to a person of ordinary skill in the art, or will become apparent in the future, as the art develops.

By way of example, cooling fluid can be supplied through two inlet pipes 64 on one side of heat exchanger 60 with respect to reaction vessel 12 can be removed through two outlet pipes 66 on the other side of heat exchanger 60 with respect to reaction vessel 12. Another example employs a single centrally mounted inlet pipe 64 at one end of heat exchanger 60 and a single centrally mounted outlet pipe 66 at the other end of heat exchanger 66. If desired, inlet pipes 64 and outlet pipes 66 can provide structural support to heat exchangers 60. Alternatively, other support structures can be employed.

Cooling pipes 62 can have any suitable cross-sectional-sectional shape, including circular. However, an elliptical shape, as shown in FIGS. 5 and 6, with a small radius of the ellipse upward, can be helpful in avoiding accumulation of solid particles on heat exchangers 60, which could impair their efficiency. Other shapes presenting upward facing surfaces of limited area can be employed for cooling pipes 62, for example triangular, oval and the like.

FIG. 5 shows a fluidized bed reactor 100 having a reaction vessel 12 of circular cross-sectional-sectional shape. FIG. 6 shows a fluidized bed reactor 100 having a reaction vessel 12 of elliptical cross-sectional-sectional shape. In each of FIGS. 5 and 6, no heating jacket 37 or filter unit 20 is shown.

Figure 7:
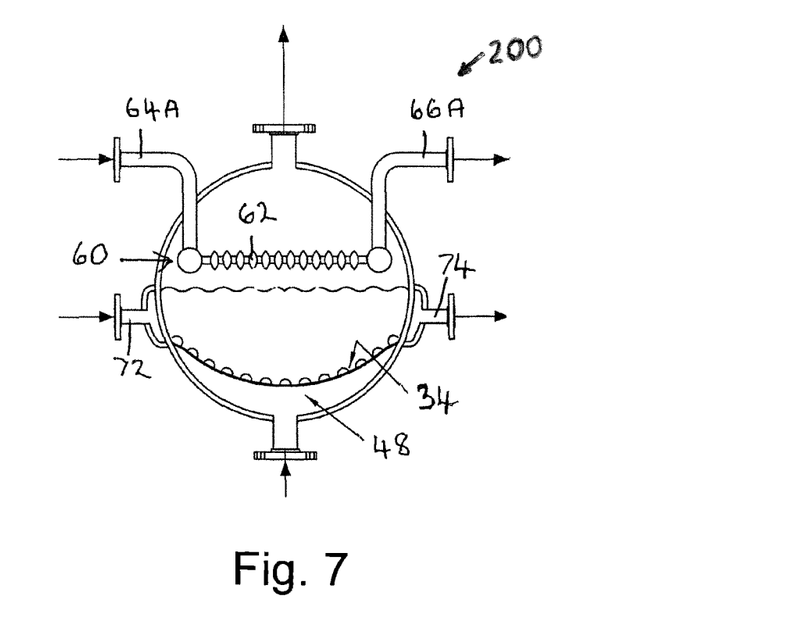
FIG. 7 is a view similar to FIG. 5, to an enlarged scale, showing a further possible modification of the fluidized bed reactor illustrated in FIGS. 4-5 to provide additional cooling.
Figure 8:
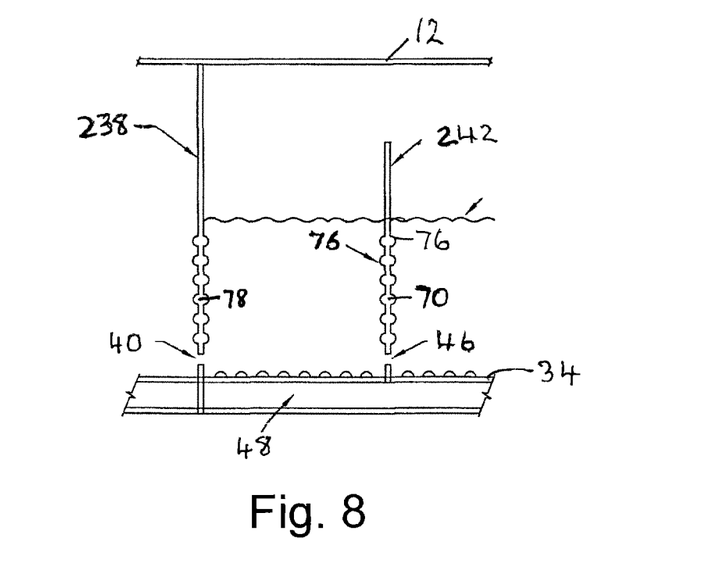
FIG. 8 is a portion of a view similar to FIG. 4, to an enlarged scale, showing additional detail regarding the modified fluidized bed reactor illustrated in FIG. 7.

The modified fluidized bed reactor illustrated in FIGS. 7-8 shows one form of cooling system for cooling the fluidized beds 35 of solid particles in the reactor once an exothermic process carried out in the reactor, such as trichlorosilane synthesis, has been brought up to temperature. The cooling systems shown, or other comparable cooling systems can help maintain the reaction in a steady state, if desired.

Referring now to FIGS. 7 and 8, the modified embodiment of fluidized bed reactor shown, referenced 200, is similar to the embodiment shown in FIG. 5 with the difference that fluidized bed reactor 200 comprises an enhanced cooling system provided by employing one or more cooling baffles 242 in place of some or all of baffles 42 employed by fluidized bed reactor 10 shown in FIGS. 1-3. Like fluidized bed reactor 100, fluidized bed reactor 200 comprises one or more heat exchangers 60 which are shown in FIG. 7 with inlet and outlet pipes 64A and 66A, respectively, that are modified by having a ninety-degree elbow a compared with inlet and outlet pipes 64A and 66 shown in FIG. 5.

Each cooling baffle 242 comprises a double wall defining an internal cavity 70 which can be supplied with a flow of cooling fluid via a cooling fluid inlet 72 and a cooling fluid outlet 74. Any suitable cooling fluid can be employed, for example the same fluid as is supplied to heat exchanger 60. To enhance heat flow between a fluidized bed 35 and cooling fluid in cavity 70, baffles 242 can be formed with ribs 76 where baffle 242 is contacted by fluidized bed 35. Other configurations than ribs 76 that will increase the outer surface area of baffle 242 can be employed, if desired.

Also shown in FIG. 8 is a zone divider 238 modified to serve as a cooling element. Cooling zone divider 238 can have a structure comparable with that of cooling baffle 242 and comprising a ribbed double wall defining an internal cavity 78. Cooling fluid inlets and outlets (not shown) for cooling zone divider 238 can be similar to inlet 72 and outlet 74 employed with cooling baffle 242.

Any suitable number of cooling baffles 242 and cooling zone dividers 238 can be employed in fluidized bed reactor 200 to provide desired cooling. For example, fluidized bed reactor 200 can be provided with four cooling baffles 242 in each fluidizing zone 32, to divide each fluidizing zone 32 into five stages, rather than using three baffles 42 providing four stages, as illustrated in FIG. 1 for fluidized bed reactor 10, thereby increasing the potential cooling capacity. Cooling baffles 242 and cooling zone dividers 238 can be mixed in the same reactor with "regular" zoned dividers 38 and baffles 42, if desired. In one embodiment of fluidized bed reactor 200, all the baffles and zone dividers are cooling baffles or cooling zone dividers.

One process for synthesizing trichlorosilane will now be described with the understanding that fluidized bed reactor 10, or another trichlorosilane synthesizer or fluidized bed reactor that accords with the invention can be utilized to implement other processes for synthesizing trichlorosilane or processes for producing other products.

In an exemplary process, a suitable fluidizing gas, for example a gas reactive with the input solid particles, is received from one or more gas supplies 18 and distributed by gas distributor plate 34 to the fluidizing zones 32. The fluidizing gas contains hydrogen chloride and fluidizes, contacts and reacts with the silicon or other particles in the fluidizing zone. The gaseous reaction product leaves the reaction vessel 12 via gas outlets 22.

In one embodiment of the invention, the downstream trichlorosilane processing system converts trichlorosilane in the gaseous product received from common output line 30 to high purity polysilicon suitable for use in harnessing solar energy.

Fluidized bed reactor 10 can be used to perform a variety of processes. One process which can be performed employing fluidized bed reactor 10 comprises a multi-stage, or multi-zone, fluidized bed process for synthesizing trichlorosilane. The synthesized trichlorosilane can be utilized in any desired manner, for example for production of high purity polysilicon.

Fluidized bed reactor 10 can be employed to perform any suitable process including the synthesis of trichlorosilane. One example of a process for synthesizing trichlorosilane using fluidized bed reactor 10 comprises feeding a stream of silicon particles into a first fluidizing zone 32 in heated reaction vessel 12 at a feed location such as through solids inlet 14. A desired fluidizing gas can be fed upwardly through each fluidizing zone 32 to fluidize the silicon particles in the fluidizing zone 32 and form a fluidized bed 35 of particles in each fluidizing zone 32. The fluidizing gas can comprise hydrogen chloride which can be anhydrous and can react with the silicon particles in the fluidized bed to form trichlorosilane. The process can further comprise guiding the stream of fluid particles to flow through the fluidizing zones 32 laterally in sequence from solids inlet 14, outputting from the reaction vessel 12 a gaseous product comprising trichlorosilane and discharging the silicon-depleted residue of the stream of silicon particles from the last fluidizing zone 32 in the lateral sequence through a discharge port such as solids outlet 16. As described, the residue may include or consist of by-products formed by impurities in the silicon feedstock, or formed in another manner, or may comprise, or include, unreacted impurities and/or unreacted silicon.

Any suitable silicon-containing material can be employed for the silicon particles. For example a technical or metallurgical grade of silicon particles having an average particle size of from about 100 to about 350 micron. One such material has a silicon content of about 97 percent to about 99 percent, for example, 98.5 percent by weight, the balance comprising impurities such as aluminum and iron and possibly traces of calcium, manganese, chromium, titanium or other materials.

As the stream of fluidized solids advances through reaction vessel 12, silicon at the outer surfaces of the silicon particles reacts with the hydrogen chloride gas to form trichlorosilane, which is gaseous at the temperature maintained in reaction vessel 12. Silicon is progressively removed from the silicon particles as trichlorosilane, diminishing the size of the silicon particles as the advance through reaction vessel 12. In a fluidized bed reactor 10 and process providing a relatively uniform residence time of the solid particles moving through the fluidizing zones 32 in reaction vessel 12 from solids inlet 14 to solids outlet 16, the average particle size of the solids particle population can decrease in each fluidizing zone 32.

As a result of their diminishment in size by reaction with hydrogen chloride, the residual particles discharged from solids outlet port 16 are significantly smaller than the input particles. Also, the residual particles can have a substantially lower proportion of silicon, as compared with the feedstock and a relatively higher proportion of impurities or by-products or both. The residual particle size can vary widely. In some cases the residual particles can be quite small and can be largely composed of impurities, such as, for example, aluminum and iron which are often major contaminants in metallurgical grade silicon, plus traces of calcium, manganese, chromium, titanium and other materials. These impurities may be present in unreacted or reacted form, for example, as the respective chlorides or other reaction products.

By way of example, of the diminution in size of the feedstock particles, employing a solids feedstock having an average particle size of from about 100 to about 350 micron, such as described herein, the average size of the residual particle can be small, for example less than 100 micron, or 55 micron or less, in some cases, for example, in the range of from about 20 to about 30 micron.

In some embodiments of the invention, little or no silicon may reach the discharge end of the fluidized bed reactor to overflow out of the fluidized bed reactor. In other embodiments of the invention, the fluidized bed reactor can be operated with some silicon overflowing the discharge end and being externally fed back to the feed end of the fluidized bed reactor, if this strategy is beneficial to the process, for example by increasing the yield of trichlorosilane.

If desired, the fluidizing gas can be separately fed to each fluidizing zone 32, for example by employing a plenum chamber such as plenum chamber 48 which is divided into gas feed regions corresponding with fluidizing zones 32. Each fluidizing gas supply 18 can supply gas to one of the gas feed regions of plenum chamber 48 and thence to gas distributor plate 34 and one of the fluidizing zones 32.

Separately feeding the fluidizing gas enables fluidizing gas to be fed to each fluidizing zone 32 at a rate which is independent of the rate of gas feed to another of the fluidizing zones 32. For example, the gas feed rate to each fluidizing zone 32 can be varied, or selected, according to the average particle size in the respective fluidizing zone 32, to maintain the fluidized bed 35 of particles in that fluidizing zone in a desired balanced, or optimal, condition. Smaller particles, with less mass, will usually need a lower rate of feed of fluidizing gas to maintain a particular bed condition.

Too fast a gas feed rate can adversely affect the quality of a fluidized bed 35, producing more turbulence, larger bubbles and more surface spikes of upwardly ejected particles which can lead to increased entrainment of particles by the discharging fluidizing gas at the surface of the bed, all of which phenomena are usually undesirable. Usefully, the process can comprise controlling the gas feed rate or rates to each fluidizing zone 32 limit entrainment of silicon particles in the gaseous product. Too slow a gas feed rate can lead to inadequate fluidization, resulting in hot spots, undue by-product formation, or unreacted or unevenly reacted silicon particles. Desirably, the gas feed rate or rates to each fluidizing zone 32 can also be controlled to avoid or to limit such undesirable phenomena.

Reducing the gas flow for smaller particles can help control formation of undesired by-products by avoiding an excess of hydrogen chloride.

Furthermore, employing separate gas feeds to the fluidizing zones 32 enables the composition of the gas to be varied between the fluidizing zones 32. For example, one or more fluidizing zones 32 can employ a fluidizing gas comprising anhydrous hydrogen chloride and hydrogen gas. Up to about 40 percent by volume of hydrogen can be employed, if desired, for example a proportion in the range of from about 0 to about 33 percent by volume, based on the volume of the fluidizing gas. In one exemplary procedure, each zone receives some hydrogen and progressively less hydrogen is employed for downstream fluidizing zones.

Fluidizing gas can be supplied from one or more gas supplies 18 so as to maintain a desired pressure in reaction vessel 12, for example a pressure selected from the group consisting of a pressure in the range of from about ambient pressure to about 20 bar, a pressure in the range of from about ambient pressure to about 10 bar and a pressure in the range of from about 1 bar to about 5 bar. One useful operating pressure is a pressure of about 3.5 bar.

The process can also comprise removing the trichlorosilane-containing gaseous product separately from each fluidizing zone, if desired.

The process can include discharging the silicon-depleted residue from the reaction vessel 12 at a height selected to determine the height of the fluidized bed 35 in the last fluidizing zone. If desired, the process can comprise selecting the heights of solids inlet 14 and of solids outlet 16 or of any other discharge port employed, to maintain the fluidized beds 35 at desired heights. For example, the process can be operated so that each fluidized bed 35 upstream of another fluidized bed 35 has a bed level incrementally higher than the level of the adjacent downstream fluidized bed 35. In the case of the fluidized bed reactor 10 shown in FIG. 1, the four upstream fluidizing zones 32 can each have a fluidized bed level incrementally higher than the level of the next adjacent downstream fluidized bed 35.

Such incremental levels between fluidized beds 35 can provide a hydraulic-like motivation to maintain a steady and continuous flow of fluidized particles through the reaction vessel 12 from one fluidizing zone 32 to another fluidizing zone 32 from the feed port at solids inlet 14 to the discharge port at solids outlet 16.

For a given solid particle feed rate, the bed levels upstream of the final downstream fluidizing zone 32 can be influenced by the level in the final fluidized bed 35 and by the sizes of the openings 40 and 46 between fluidized beds 35. In general, the fluidized bed level in each stage 44 should be higher on the upstream side of a zone divider 38 or baffle 42 than the level on the downstream side. This differential level or incremental level can propel or drive the solid product through an opening 40 or 46.

In some cases, when a process such as a trichlorosilane synthesis is operating at steady state, or equilibrium, the flow rate of the feed of solid particles of silicon or other material into the first fluidizing zone 32, in terms of the number of particles, can approximately equal the flow rate through each port comprised by zone openings 40 and baffle openings 46 and approximately equal to the flow rate leaving solids outlet 16.

In a process where the solid particles are supplied to reaction vessel 12 at a constant feed rate, the differential level on each side of an opening 40 or 46 can sometimes adjust itself to meet the requirement that the solid particles flow through all the openings 40 and 46 at the same rate as they feed and discharge, in terms of numbers of particles.

The levels of fluidized beds 35 can be constant under steady state conditions, with each upstream stage level being higher than the adjacent downstream stage level providing enough "head" to cause an appropriate flow rate of particles through an opening 40 or 46. A smaller opening 40 or 46 can require more "head", or differential bed level, to attain the steady state flow rate and a larger opening can require less differential level.

Fluidizing gas flow rate for optimum fluidization decreases with decreasing particle size. Excessive flow rate causes increased particle entrainment from the fluidized bed 35 into the off gas leaving the bed. This feature is extremely important when the average particle size of a particle system is changing as the reaction proceeds.

Desirably, the process can be operated to maintain a continuous flow of the stream of solid particles through the reaction vessel 12 from the feed port to the discharge port via the fluidizing zones 32. Maintaining such a continuous flow, in a lower portion of an approximately horizontally disposed reactor such as fluidized bed reactor 10, while providing space in an upper portion of the reactor, above the fluidized beds 35, to accommodate the gaseous products discharging vertically through the upper level of the fluidized beds 35 can help maintain a desired temperature profile and a desired residence time for the silicon materials in fluidized bed reactor 10.

An example of one way in which a continuous flow can be maintained is by suitable adjustment of the solids feed rate to maintain a continuous overflow or discharge from solids outlet 16 while providing adequate fluidizing gas flow to fluidize the solids. Excess solids flow should be avoided to prevent loss of fluidization or clogging. Excess fluidizing gas flow should be avoided to prevent undue solids entrainment in the output gaseous product.

As illustrated in the fluidized bed reactor 10 shown in FIG. 1, fluidizing zones 32 are contiguous one to another and are divided one from another by zone dividers 38. With such a construction the process can comprise guiding the stream of silicon particles to flow from one fluidizing zone 32 to a next adjacent fluidizing zone 32 through at least one zone opening 40 in the respective zone divider, the at least one zone opening 40 being located to communicate with a fluidized bed 35 in the respective adjacent fluidizing zone 32. If desired, the extent of the open area of each zone opening 40 can be selected to control the increment in level of the next upstream fluidizing zone.

The height of each fluidized bed 35, referring to the fluidized silicon particles in the bed, can have any suitable value, for example a value in a range selected from the group consisting of from about 5 mm to about 500 mm; from about 10 mm to about 100 mm; and less than 30 mm.

Optionally, the process can comprise dividing each fluidizing zone 32 into multiple stages 44, with at least one baffle 42, and flowing the silicon particle stream from one stage 44 to a next stage 44 through at least one baffle opening in the respective baffle dividing the stages 44. If desired, each fluidizing zone 32 is divided into stages 44 by from 1 to 10 baffles 42.

The baffle openings can be staggered transversely of the lateral direction in which the fluidizing zones 32 are arranged and the process can comprise guiding the stream of silicon particles along a serpentine path from solids inlet 14 to the discharge port provided by solids outlet 16. The solids stream can flow in a continuous sequence through each zone opening 40 and each baffle opening 46. Such a baffle maze can provide a more uniform residence time distribution for the population of solid particles in each zone. Increasing the number of stages 44 in a fluidizing zone 32, can be expected to provide more uniform residences times for the solids particle population in the zone.

Zone openings 40 in zone dividers 38 and baffle openings 46 in baffles 42 permit a continuous steam of silicon solids material to pass from each stage 44 to the next stage 44 in sequence and overflow the discharge port at the solids outlet in the final downstream stage 44, in a manner that can be compared with the flow of a truly liquid phase. Usefully, zone openings 40 and baffle openings 46 can be alternated from one side to the other side of reaction vessel 12 to reduce the possibility of some of the flowing solid particles taking short circuits on the route from solids inlet 14 to solids outlet 16, reducing their residence time.

The process can be operated so that the discharged silicon-depleted residue particles have a desired average residence time in the reaction vessel 12. For example, the average residence time can be in the range of from about 10 minutes to about 30 hours or can have another suitable value.

The process can comprise heating the multiple fluidizing zones 32 and controlling the temperature of each fluidizing zone 32 independently with respect to the temperatures of other fluidizing zones 32. Temperature control can be effected in various ways as will be apparent to a person of ordinary skill in the art, or will become apparent in the future, as the art develops. Independent temperature control of the fluidizing zones 32 can help maintain desired temperature levels throughout the reaction vessel 12.

The fluidizing zone temperature can be controlled to have any suitable value or values in each fluidizing zone. For example, the process can comprise heating the silicon particles to a temperature in the reaction vessel in a range of from about 280° C. to about 400° C. One suitable temperature for trichlorosilane synthesis is a temperature of about 350° C. in one or more or all of fluidized beds 35. If desired, the process can comprise controlling the temperature of each fluidizing zone independently with respect to the temperatures of other fluidizing zones.

Independent heating can enable the fluidizing zone temperatures to be controlled so that each fluidizing zone has a desired temperature according to the processing objectives of each fluidizing zone. For example, at startup, it may be desirable to heat an upstream zone before a downstream zone or more rapidly than a downstream zone. Also the heat requirements for a one fluidizing zone may be different from those of another so that individual heat control of the fluidizing zones can be helpful in maintaining a uniform temperature throughout a number of fluidized beds should it be desirable to do so.

When operating an exothermic process such as trichlorosilane synthesis, heating jacket 37 can be employed at startup to reach a desired operating temperature of the fluidized beds 35, for example about 350° C. Once the operating temperature is attained, cooling may be desirable to maintain a steady state, or to avoid overheating and possible undesired formation of by-products. Accordingly, the process can comprise cooling one or more of the fluidizing zones to maintain desired operating temperatures in either or both the fluidized beds 35, or the volumes above fluidized beds 35 in reaction vessel 12 after the respective fluidizing zone 32 or fluidizing zones 32 has or have been heated to the desired operating temperature. From one to all of the fluidized beds 35 and/or freeboard reaction vessel volume can be cooled, according to circumstances.

If desired, such cooling of one or more of the freeboard reaction vessel volumes can be effected by a cooling system such as heat exchanger 60 illustrated in FIGS. 4-6 and can be effected to control formation of undesired by-products. A process according to the invention for synthesizing trichlorosilane can comprise cooling one or more of the freeboard reaction vessel volumes to a temperature in the range of from about 300° C. to about 100° C., or to a temperature in the range of from about 200° C. to about 150° C., for example about 175° C.

Cooling of one or more of the fluidized beds 35 can be effected by employing a cooling system such as is illustrated in FIGS. 7-8 comprising at least one cooling zone divider 238 or at least one cooling baffle 242 or at least one cooling zone divider 238 and at least one cooling baffle 242.

Moreover, the exemplary process here described can optionally comprise filtering the gaseous product to remove entrained silicon particles from the gas stream and returning the filtered silicon particles to the reaction vessel 12. At least one filter member can be employed to trap the entrained silicon particles and the at least one filter member can be periodically subjected to a reverse flow, or reverse pulse, of gas to liberate the entrapped particles for return to the reaction vessel 12.

Also, the process can comprise separately filtering the flow of gaseous product from each fluidizing zone 32 to remove entrained silicon particles from the gas stream and returning the removed silicon particles to the respective fluidizing zone 32 from which the respective flow of gaseous product originated, or to another desired fluidizing zone 32.

The off gas product leaving the fluidized bed of MG-Si at 350° C. passes through this cooling piping array in each zone where its temperature is dropped to 175° C. This is very important because the by product reaction that makes the $SiCl_4$ by product is made very sluggish at this lower temperature so little $SiCl_4$ has time to be formed in the few seconds between the surface of the bed and the bottom of the cooling tubes.

If desired, the process can comprise returning a portion of, or all of the silicon-depleted residual particles discharged from the discharge port to the reaction vessel 12. In some cases the silicon-depleted residual particles may have so low a level of silicon remaining that recycling is unattractive or undesirable.

The trichlorosilane-containing gaseous product output from gas outlet or outlets 22, can be subjected to any desired further processing, including filtration with a filter apparatus, as described herein, or by other means. For example, a process according to the invention can include purifying the trichlorosilane-containing gaseous product downstream of the reaction vessel to produce purified trichlorosilane. Purification can include condensation and distillation of the gaseous product and optionally, absorption purification.

The invention also includes the trichlorosilane product of any process according to the invention that is described herein for producing trichlorosilane. In addition to trichlorosilane, and possibly, residual proportions of the feedstock gases such as hydrogen chloride and hydrogen, the gaseous product output through gas outlets 22 can comprise, silicon tetrachloride, dichlorosilane, and other by-products sometimes known as "high boilers" which can comprise various of silane compounds containing Si—Si and/or Si—O—Si bonds. If desired, the gaseous product can be sent to one or more separation systems for recovery of trichlorosilane, recycle and/or disposal of these by-products, for example, a purifying process such as described herein. The invention includes such downstream processes and apparatus when employing a gaseous product according to the present invention.

It will be understood that other processes can be carried out in fluidized bed reactor 10 in a comparable manner to the described example wherein trichlorosilane is synthesized.

Where reference has been made herein to fluidized bed reactor 10 it will be understood that such reference can alternatively refer to fluidized bed reactor 100 or fluidized bed reactor 200, unless the context indicates otherwise.

One example of the practice of the invention will now be described, for illustrative purposes, and without intending to limit the scope of the invention.

EXAMPLE

This example illustrates the production of trichlorosilane using a trichlorosilane synthesizer comprising a fluidized bed reactor, such as fluidized bed reactor 100. As shown in FIG. 4, the fluidized bed reactor is equipped with multiple baffled fluidizing zones arranged horizontally in a side-by-side series. Also, the fluidized bed reactor comprises an overhead or "over-bed" cooling system comprising heat exchangers, such as heat exchangers 60, to cool the off gas rising from the fluidized beds of silicon particles in the fluidizing zones. Other details of fluidized bed reactor 100 are substantially as described herein with reference to FIGS. 4 and 5, unless the context indicates differently. A continuous stream of silicon particles is supplied through solids inlet 14 and anhydrous hydrogen-chloride-containing fluidizing gas is supplied to gas supplies 18. The fluidized bed reactor is brought up to a substantially steady state where gas and solids flow into and out of the reactor at approximately constant rates and temperature conditions are reasonably stable. Heat from heating jacket 37 is used to bring the fluidized bed reactor up to temperature and heating system controls as well as cooling are used, as appropriate, to maintain stable temperature conditions.

Tables 1 and 2, which are a part of this example set forth some approximate quantitative data regarding the operation of one embodiment of fluidized bed reactor 100 to produce trichlorosilane as can be determined by computer modeling. These data are intended to be merely exemplary of suitable, or possible, data that can be determined by a person of ordinary skill in the art, without undue experimentation, in practicing the described embodiment of the invention and are subject to variation. Data encountered or employed in practicing other embodiments of the invention may vary significantly.

TABLE 1

Fluidized Bed Reactor Characteristics

|  | Zones 1-5 |  |
| --- | --- | --- |
| Reactor Design |  |  |
| Zone Volume | 0.17 | m³ |
| Zone Length | 0.76 | m |
| Stage Length | 0.15 | m |
| # of Stages per Zone | 5 |  |
| # of Baffles per Zone | 4 |  |
| Vessel Diameter | 0.76 | m |
| Vessel Length | 3.81 | m |
| Process Conditions |  |  |
| Pressure | 3.5 | Bar |
| Bed Temp | 350° | C. |
| Mass Rate | 671 | Kg/hr |
| Average Particle Size | 200 | micron |
| Average Particle Volume | 4.2 | micrometer³ |

Table 1 describes quantitatively a horizontally disposed fluidized bed reactor which, as noted in the table, is about 3.81 m long and has a circular cross-sectional-sectional shape of about 0.76 m diameter. The fluidized bed reactor is divided into five equal zones each having a volume of about 0.17 m³. Each zone is divided into five equal zones by four baffles per zone, and each zone has a length of about 0.76 m.

Fluidized bed reactor 10 is operated at a pressure of about 3.5 bar and a temperature in fluidized beds 35 of about 350° C. in each of the five fluidizing zones 32. Silicon particles having an average particle size of about 200 micron and an average volume of about 4.2 micrometer³ are fed into fed into fluidized bed reactor 100 at a rate of about 671 kg/hr.

TABLE 2

Trichlorosilane Synthesizer Operating Parameters

|  | Zone 1 | Zone 2 | Zone 3 | Zone 4 | Zone 5 |  |
| --- | --- | --- | --- | --- | --- | --- |
| Fluidizing Gas |  |  |  |  |  |  |
| Fluidizing Gas Velocity | 7.32 | 7.01 | 6.40 | 5.49 | 3.35 | m/min |
| Fluidizing Gas Volume | 4.25 | 3.99 | 3.66 | 3.17 | 1.90 | m³/min |
| Gas Temperature In | 25 | 25 | 25 | 25 | 25 | ° C. |
| Gas Temperature Out | 350 | 350 | 350 | 350 | 350 | ° C. |
| H₂ Percentage | 33% | 29% | 24% | 14% | 0% | % H₂ |
| Volume H₂ Flow | 1.79 | 1.50 | 1.13 | 0.57 | — | m³/min |
| Volume HCl Flow | 3.68 | 3.66 | 3.60 | 3.51 | 2.44 | m³/min |
| Silicon Processing |  |  |  |  |  |  |
| Mass Si Consumed | 139 | 138 | 136 | 133 | 92 | kg/hr |

TABLE 2-continued

Trichlorosilane Synthesizer Operating Parameters

|  | Zone 1 | Zone 2 | Zone 3 | Zone 4 | Zone 5 |  |
| --- | --- | --- | --- | --- | --- | --- |
| Average Particle Size | 186 | 169 | 149 | 120 | 55 | micron |
| Average Particle Volume | 3.37 | 2.55 | 1.73 | 0.91 | 0.09 | micrometer$^3$ |
| Exotherm | −949,000 | −938,000 | −925,000 | −908,000 | −625,000 | kJ/hr |
| Freeboard Cooler |  |  |  |  |  |  |
| Off Gas Temperature In | 350 | 350 | 350 | 350 | 350 | ° C. |
| Off Gas Temperature Out | 175 | 175 | 175 | 175 | 175 | ° C. |
| Gas Cooldown | −157,209 | −149,656 | −139,928 | −125,695 | −78,211 | kJ/hr |

Referring now to Table 2, fluidizing zones 32 are numbered in sequence from Zone 1 through Zone 5 reading across the table beginning at the solids feed end of fluidized bed reactor 100.

Reading down Table 2, the first two lines provide one example of values for flow rates, in linear and volumetric terms, of a hydrogen-chloride containing fluidizing gas which is supplied at different rates to each of the five fluidizing zones 32. The gas flow rate to each fluidizing zone can be seen to be reduced in an approximately exponential relationship to the distance of the respective fluidizing zone from the solids feed. Thus, the difference between the flow rate to a given zone and the flow rate to the immediately preceding zone steadily increases. The flow rate to Zone 2 is a little less than that to Zone 1. The flow rates to Zones 3 and 4 are incrementally further reduced below the flow rates of Zones 2 and 3 respectively. And the flow rate to Zone 5 is still further reduced below that to Zone 4.

The fluidizing gas is supplied to each of fluidizing zones 32 at a temperature of about 25° C. and is heated to a temperature of about 350° C.

Following the gas temperatures in Table 2, are data for an example of a fluidizing gas comprising a mixture of hydrogen chloride and hydrogen which varies in composition between one zone and another. As shown by the values in Table 2 for $H_2$ percentage and for the relative volumes of H2 and HCl, the volume percentage of $H_2$ in the gas composition is reduced steadily from Zone 1 where it is about 33% to a value of 0 in Zone 5 where the mass of the silicon particles is substantially less.

The mass of silicon consumed in each zone, and removed as trichlorosilane through gas outlets 22 is fairly constant in Zones 1-3 at about 136-139 kg/hr, declines in Zone 4 to 133 kg/hr and drops dramatically in Zone 5 to 92 kg/hr suggesting that the silicon particles are becoming exhausted of silicon.

The average particle sizes and volumes also decline steadily from Zones 1-5, showing a steep drop in Zone 5 as compared with Zone 4. The values for the declines also suggest an exponential pattern.

The heat output from each zone, labeled "Exotherm" in Table 2, shows a similar pattern, declining relatively slowly between the earlier zones, Zones 1-4 and dropping sharply in the last zone, Zone 5.

The final section of Table 2 provides data illustrating the possible effect of employing in fluidized bed reactor 100 the cooling system illustrated in FIGS. 4-5 which incorporates heat exchangers 60 to cool the freeboard, gas-occupied volume above the fluidized beds 35. In the model employed, the off gas rises from the fluidized beds 35 at a temperature of about 350° C. The cooling system operates at various rates, according to the zone, to maintain the gases leaving the freeboard volumes at a useful temperature, for example a temperature of about 175° C., in each of Zones 1-5, helping to control the formation of by-products. As shown in the last line of Table 2, the quantity of heat removed by the cooling system declines from zone to zone and is smallest for Zone 5.

The modeled data provided in Table 2 illustrate a pattern of progressive removal of silicon from the silicon particles, by hydrochlorination. By Zone 5, the particles are small in size, the gas flow required for fluidization is low, the yield of silicon has become relatively small (most of the silicon having been given up as trichlorosilane in Zones 1-4), and the heat output by the reaction and removed by the cooling system is substantially reduced.

The data in Tables 1-2 illustrate, inter alia, how a trichlorosilane synthesizer and process according to the invention can be operated to adapt to the diminishment in size of the input stream of silicon particles which occurs as the process advances, by changing certain variable operating parameters of fluidized bed reactor 100, for example, fluidizing gas rate and composition and cooling rate, to maintain desirable conditions in the reactor.

Benefits

A variety of benefits can be obtained with one or more practical embodiments of processes or trichlorosilane synthesizers according to the invention, some of which will now be described.

For example, the invention can be practiced using a horizontal fluid bed reactor equipped to process a relatively shallow beds of silicon particles fluidized with hydrogen chloride-containing gas which silicon particles flow through the fluidized bed reactor in a stream and are continuously converted to gaseous reaction products as they flow.

Use of relatively shallow fluidized beds arranged side-by-side, for example in a horizontal reactor, can favor the production of trichlorosilane and can provide a good yield of trichlorosilane with a low yield of by-products such as silicon tetrachloride. Thus, in some embodiments, a more efficient reactor can be provided, which can result in a smaller reactor being required for a given unit production capacity.

The trichlorosilane-forming reaction usually proceeds more rapidly than does the reaction or reactions that form by-products. Accordingly, there can be advantage in employing a relatively low fluid bed level because the gas phase contact time is shorter in a shallow or low bed, favoring the faster more favorable reaction.

Employment of such a side-by-side or horizontal reactor, by favoring conversion to trichlorosilane and inhibiting the production of by-products, can simplify the problem of removing heat from the system and controlling temperatures in the fluidized bed reactor.

As described, a fluidized bed reactor such as fluidized bed reactor 10 organized into side-by-side laterally displaced fluidizing zones can permit the fluidizing gas velocity to be reduced in one or more downstream fluidizing zones as the particle size of the silicon particles reduces. The reduced fluidizing velocity can result in less entrainment of fine particles by the fluidizing gas. The reduced fluidizing velocity can also help reduce by-product formation by avoiding or reducing any excess of hydrogen chloride that may be present.

A lateral disposition of fluidizing zones also permits different fluidizing gas compositions to be employed in different fluidizing zones, if desired. This option can help reduce by-product formation, providing a relatively more pure trichlorosilane-containing product, by for example, including hydrogen in the fluidizing gas in one or more fluidizing zones. Hydrogen gas can be supplied by recycling from the output gaseous product after removal of trichlorosilane and by-products, if desired, or from any other suitable source.

In this way, processes according to the invention can provide a relatively pure, or purer, trichlorosilane-containing product for downstream purification or other processing.

In contrast in a vertical reactor, with two fluidizing stages or fluidizing zones disposed one above the other, silicon particles which will be of various sizes as the silicon is consumed, are mixed together in the same volume, and all share the same relatively high fluidizing velocity. This arrangement can result in a relatively large carry out of fine silicon particles from the vertical reactor as the reaction proceeds.

Disclosures Incorporated. The entire disclosure of each and every United States patent and patent application, including Provisional Patent Application No. 61/177,556 and U.S. Pat. No. 4,526,769, that is specifically referenced in this specification is hereby incorporated by reference herein, in its entirety. Should there appear to be conflict between the meaning of a term employed in the description of the invention in this specification and with the usage in material incorporated by reference from another document, the meaning as used herein is intended to prevail.

The foregoing detailed description is to be read in light of and in combination with the preceding background and invention summary descriptions wherein partial or complete information regarding the best mode of practicing the invention, or regarding modifications, alternatives or useful embodiments of the invention may also be set forth or suggested, as will be apparent to one skilled in the art. The description of the invention is intended to be understood as including combinations of the various elements of the invention, and of their disclosed or suggested alternatives, including alternatives disclosed, implied or suggested in any one or more of the various methods, products, compositions, systems, apparatus, instruments, aspects, embodiments, examples described in the specification or drawings, if any, and to include any other written or illustrated combination or grouping of elements of the invention or of the possible practice of the invention, except for groups or combinations of elements that will be or become apparent to a person of ordinary skill in the art as being incompatible with or contrary to the purposes of the invention.

Throughout the description, where compositions are described as having, including, or comprising specific components, or where processes are described as having, including, or comprising specific process steps, it is contemplated that compositions of the present invention can also consist essentially of, or consist of, the recited components, and that the processes of the present invention can also consist essentially of, or consist of, the recited processing steps. It should be understood that the order of steps or order for performing certain actions is immaterial so long as the invention remains operable. Moreover, two or more steps or actions may be conducted simultaneously. In addition, all proportions recited herein are to be understood to be proportions by weight, based upon the weight of the relevant composition, unless the context indicates otherwise.

The present invention includes the examples and embodiments described herein and other specific forms that embody the spirit or essential characteristics of the invention or of the respective described examples or embodiments. The foregoing examples and embodiments are in all respects intended to be illustrative of the invention described herein. It is to be understood that many and various modifications will be apparent to those of ordinary skill in the relevant art, or may become apparent as the art develops, in the light of the foregoing description. Such modifications are contemplated as being within the spirit and scope of the invention or inventions disclosed in this specification.

The invention claimed is:

1. A multi-stage fluidized bed process for synthesizing trichlorosilane comprising:
    feeding a stream of silicon particles into a first fluidizing zone in a heated reaction vessel at a feed location, the reaction vessel comprising multiple intercommunicating fluidizing zones disposed laterally adjacent one to another;
    separately feeding a fluidizing gas upwardly through each fluidizing zone to fluidize the silicon particles in each fluidizing zone, wherein the fluidizing gas comprises hydrogen chloride and reacts with the silicon particles to form trichlorosilane;
    guiding a portion of the stream of silicon particles through the fluidizing zones laterally in sequence from the feed location;
    reducing the feed rate of the fluidizing gas fed into subsequent fluidizing zones as the average size of the silicon particles is reduced in each subsequent fluidizing zone; and
    outputting gaseous product comprising trichlorosilane from at least one gas outlet in communication with the reaction vessel to a downstream processing system or storage system.

2. A process according to claim 1 comprising continuously feeding the stream of silicon particles into the first fluidizing zone.

3. A process according to claim 1 comprising feeding fluidizing gas having a first composition into the first fluidizing zone and feeding fluidizing gas having a second composition into one of the subsequent fluidizing zones.

4. A process according to claim 1 comprising removing the trichlorosilane-containing gaseous product separately from each fluidizing zone.

5. A process according to claim 1 comprising heating the multiple fluidizing zones and controlling the temperature of each fluidizing zone independently with respect to the temperatures of other fluidizing zones.

6. A process according to claim 1 comprising cooling one or more of the fluidizing zones to maintain a desired operating temperature after the respective one or more fluidizing zones has been heated to the desired operating temperature.

7. A process according to claim 4 comprising filtering the gaseous product to remove entrained silicon particles from the gaseous product and returning the filtered silicon particles to the fluidizing zone from which the silicon particles originated.

8. A process according to claim 7 comprising filtering the gaseous product from one fluidizing zone with a first sized filter and filtering the gaseous product from a separate fluidizing zone with a second sized filter different from the first size.

9. A process according to claim 1 comprising cooling the gaseous product to about 175° C. before outputting the gaseous product.

10. A process according to claim 1 comprising cooling the gaseous product with at least one cooling pipe located within at least one fluidizing zone and above the stream of fluidized particles.

11. A process according to claim 1, comprising continuously feeding a stream of silicon particles into the first fluidizing and continuously outputting gaseous product comprising trichlorosilane.

12. A process according to claim 7 wherein returning the filtered silicon particles to the fluidizing zone from which the silicon particles originated includes reversing a flow of gas to blow the filtered silicon particles back to the fluidizing zone from which the silicon particles originated.

* * * * *